Figure 1:
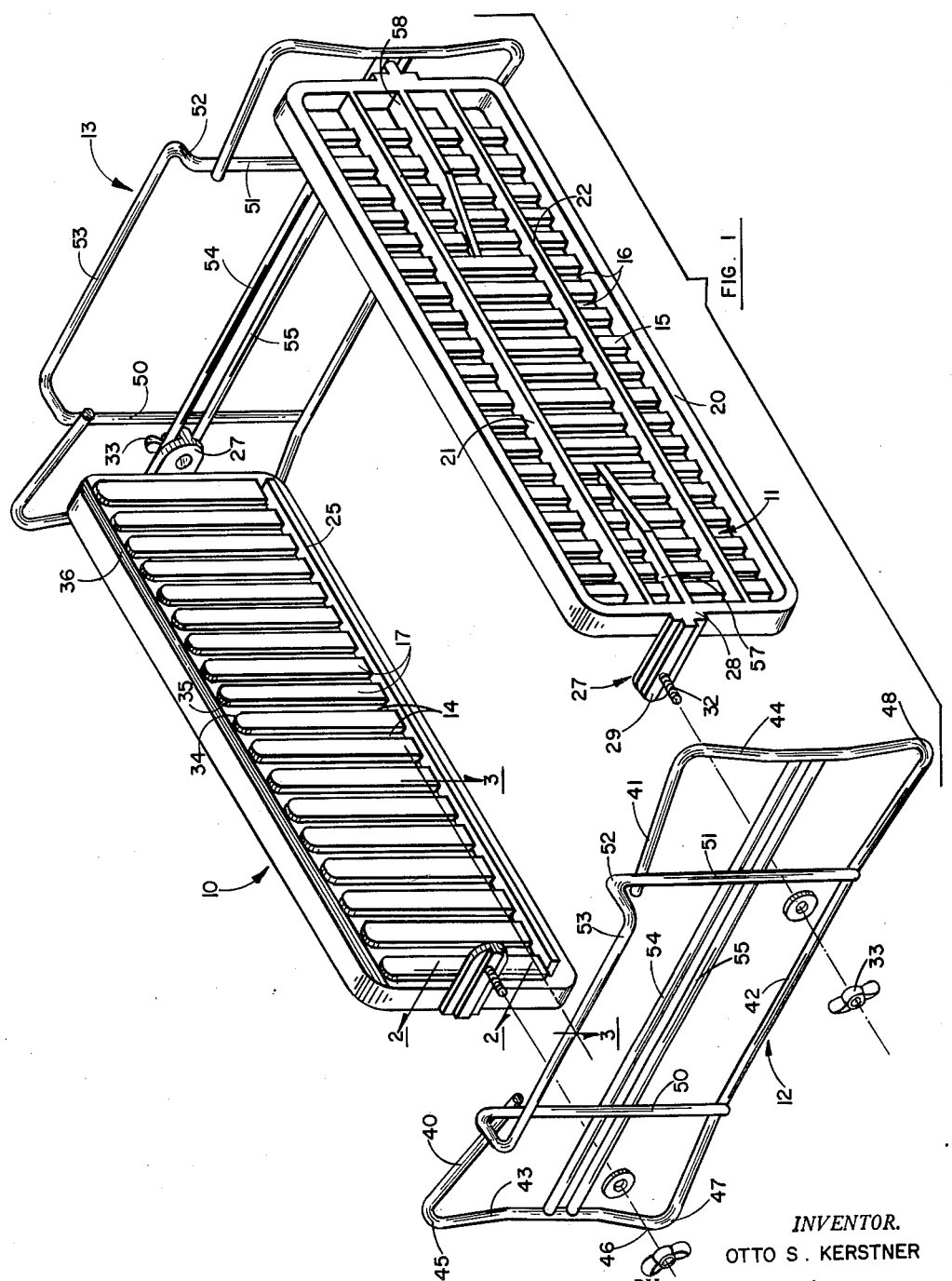

Dec. 26, 1961  O. S. KERSTNER  3,014,594
ADJUSTABLE GROOVED FIXTURE
Filed Dec. 15, 1960  2 Sheets-Sheet 1

INVENTOR.
OTTO S. KERSTNER
BY *Allan Rothenberg*
ATTORNEY

*INVENTOR.*
OTTO S. KERSTNER

BY Allan Rothenberg

ATTORNEY

United States Patent Office 3,014,594
Patented Dec. 26, 1961

3,014,594
ADJUSTABLE GROOVED FIXTURE
Otto S. Kerstner, Downey, Calif., assignor to
North American Aviation, Inc.
Filed Dec. 15, 1960, Ser. No. 76,022
9 Claims. (Cl. 211—41)

This invention relates to article handling devices and particularly concerns an adjustable grooved fixture for handling in bulk items of card-like configuration which are desirably held at their edges.

Items such as printed circuit boards, printed circuit board assemblies and the like have critical surfaces but are frequently manufactured and handled in large numbers. For efficient production techniques these items must be handled and temporarily packaged in bulk with as great a density as possible; that is, the items must be closely packed for greatest handling efficiency.

Handling of such card-like items has been accomplished by inserting the edges of the items in a saw-cut groove which is cut in the sides of a wood box. Other methods involve the use of a strip of metal with die-formed grooves which is nailed or otherwise secured to the sides of the box. These arrangements are rigid and inflexible since but one length of items could be handled. For handling of a different size item or if production techniques change to require a different size item, a new handling fixture must be designed and fabricated. Thus, the prior arrangements are expensive and inflexible by reason of requiring many relatively expensive fixtures for handling all of the many different sizes of items.

Accordingly, it is an object of this invention to provide an adjustable grooved fixture which is of simple but rugged construction and can be made in quantity at low cost.

The present invention affords simplicity, low cost and flexibility, and facilitates the implementation of modular packaging and handling concepts to provide increased efficiency in the handling of items with critical surfaces. In carrying out the invention according to a preferred embodiment thereof, there is provided a pair of upstanding mutually spaced side members of substantially corrugated horizontal section which provide vertically extending grooves for receiving edges of items to be supported and carried in the fixture. The side members are of a configuration and design which is particularly adapted to manufacture by the use of injection molding techniques. Each side member has a relatively narrow inwardly projecting ledge extending along its lower portion to close the bottoms of the grooves and provide support for items. The side members are fixedly but adjustably secured together with a proper spacing between them by means of a pair of skeletal end frames, each of which is formed with a horizontally extending pair of guide bars. Each end of each side member rigidly carries a connecting lug having a guide portion which is slidably engaged within and between the guide bars of the end frames so that a single bolt or comparable connecting device may be employed to rigidly secure the side member to the end frame and, at the same time, provide proper alinement of the side members.

It is an object of this invention to improve bulk handling of card-like items.

A further object is the provision of an item handling fixture particularly adapted to modular handling techniques.

Still another object of the invention is to provide an item handling fixture which is easily adjustable for use with items of varying sizes but will retain a desired configuration and size when adjusted.

Figure 3:
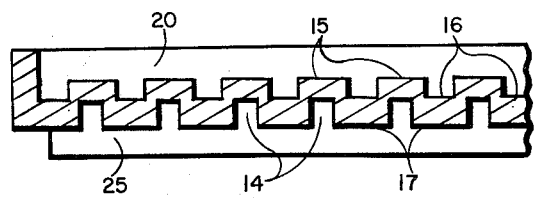
Figure 2:
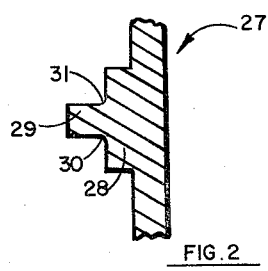

These and other objects of this invention will become apparent from the following description taken in connection with the accompanying drawings, in which FIG. 1 comprises a pictorial representation of a preferred embodiment of a fixture constructed according to the principles of this invention with parts shown in exploded relation;

FIG. 2 comprises a section taken on lines 2—2 of FIG. 1;

FIG. 3 comprises a section taken on lines 3—3 of FIG. 1; and

Figure 4:
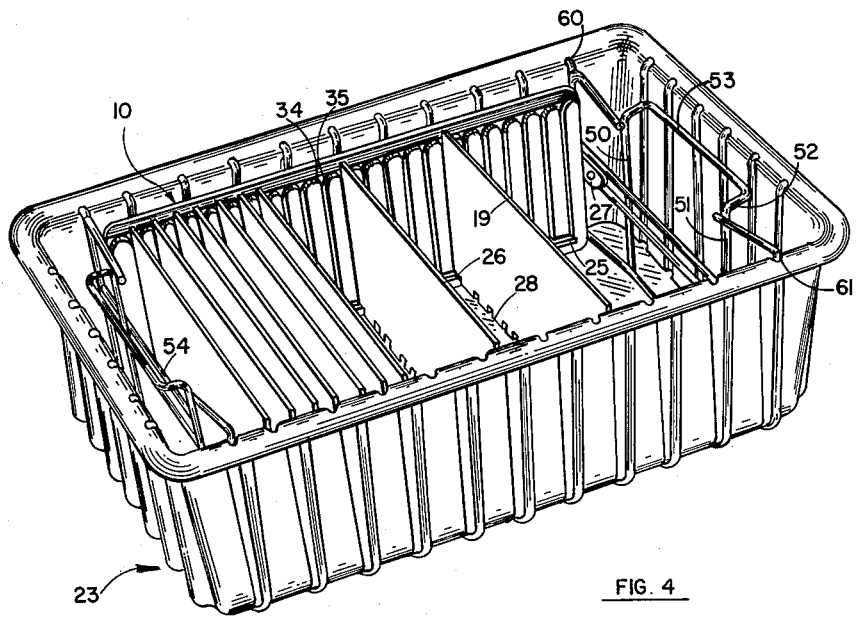

FIG. 4 is a pictorial view of the adjustable fixture mounted in an exemplary tote box.

In the drawings like reference numerals refer to like parts.

As illustrated in FIG. 1, the adjustable grooved fixture of the preferred embodiment comprises a pair of upstanding normally vertical side members 10 and 11 secured in adjustable spaced relation by means of a detachable connection with a pair of skeletal end frames 12 and 13. Each side member is preferably formed in a single integral piece by injection molding employing a suitable plastic such as polyethylene or polypropylene. The latter is preferred because of its greater dimensional stability, better temperature range, and lower cost. Obviously other materials are available for use in this invention.

As illustrated in FIG. 3, each side member is of substantially corrugated cross section with vertically extending slots 14 formed on its inner faces and alternate lands 15 and grooves 16 formed on the outer faces. The lands 15 are alined with the grooves 14 on each side member while the grooves 16 on the outer faces are alined with the corresponding spaces 17 on the inner faces between the adjacent grooves 14. Each side member, for purposes of providing rigidity, is provided with an integral continuous outwardly projecting perimetral flange 20 and, where the length of the side member so requires, additional reinforcement is provided by a pair of horizontal longitudinally extending outwardly projecting reinforcing ridges 21, 22, which extend from end to end of the side member and closely follow the configuration of the lands and grooves of the outer face.

In certain cases where the fixture is to be utilized entirely with and in a tote box, such as the box 23 illustrated in FIG. 4, no horizontal support is necessary or will be provided for the items which are received in the grooves 14 of the side members. However, for greater flexibility and in order to allow the use of the fixture apart from the tote box, each side member is provided with a horizontally extending relatively narrow ledge or item support bar 25 which projects inwardly from the inner surface of the side member to close the bottoms of the grooves 14 and provide support for the items to be handled.

Each end of each side member is provided with a simple and improved type of connecting lug which is so arranged for cooperation with the skeletal end frames as to insure alinement of the side members; that is, a desired angular relation, normally 90 degrees, between the side members and the end frames. This relation is maintained by the use of a single connecting bolt. The connection lug 27, also shown in cross section in FIG. 2, comprises a flat, relatively thin inwardly extending reinforcing portion 28 and a guide portion 29 extending inwardly from the body of the associated side member for substantially the entire length of the lug. The guide portion projects outwardly from the reinforcing portion of the lug and is formed with curves 30 and 31 of radii such as will accurately mate with corresponding guide elements of the end frames, as will be more particularly described hereinafter. The connecting lugs 27 are formed with apertures to receive suitable connecting devices, such as the bolt and nut assemblies 32, 33, together with suitable lock washers.

Each side member has the upper ends of the inner face lands 17 thereof curved or downwardly and inwardly inclined toward each groove 14 as indicated at 34, 35 in order to facilitate the insertion of the edges of items which are supported in the grooves upon the ledge 25. For the same reason, the upper edge of each side member is formed with a continuous inward and downward bevel 36.

Each end frame, as illustrated in FIG. 1, comprises an outer rod of substantially rectangular configuration having inwardly extending but mutually spaced end portions 40 and 41 and including a bottom element 42 and side elements 43, 44. The side elements and the bottom element are all rebated or bent inwardly so as to provide for point contact of the end frame and thus of the entire fixture at its bottom and on each side. Thus, the side element 43 is provided with a pair of support points 45, 46, while the bottom element 42 has support points 47, 48. This arrangement facilitates the insertion of the grooves fixture in the grooves of tote box 23 and provides less friction and greater ease of alinement than would a corresponding straight portion.

Each frame includes a handle rod of substantially inverted U-shape having vertical leg portions 50, 51 which are affixed to and extend between the bottom element 42 and the end portions 40 and 41, respectively. The elements are secured preferably by welding. The upper end of the leg portions 50 and 51 are each bent outwardly as at 52 to connect with the integral bight portion 53 and provide a handle lying outwardly of the plane of the end frames. This arrangement facilitates grasping of the fixture while avoiding contact with critical surfaces of items which have been located in the end grooves.

Each end frame carries a pair of guide bars 54, 55 which extend substantially horizontally across the frame and are rigidly secured, as by welding, to the leg portions of the handle rod 53. Preferably the end of the guide bars 54, 55 abut the inner edges of the side elements 43, 44. If desired and convenient, the edges of the guide bars 54, 55 abut the inner edges of the side elements 43, 44. The vertical spacing between the guide bars 54 and 55 is substantially equal to (or slightly less than if a tight fit is desired) the vertical extent of the guide portion 29 of connecting lug 27. Also, the guide bars 54, 55 are of a radius and substantially equal to the radius of curvature of curves 30 and 31 of the connecting lugs.

The guide portions 29 of the connecting lugs 27 are received throughout their length in close-fitting engagement between the guide bars 54 and 55, while the bolt and nut 32, 33 fixedly maintain this relation. Since the guide portion 29 has substantial length in the direction of the extent of the guide bars 54, 55, the connecting lug 27 is thereby maintained in alinement with the guide bars and thus the side member itself, which is integral with the connecting lug, is maintained at the proper angular relation with respect to the end frame. Of course, upon the loosening of the connecting device 32, the distance between the side members 10, 11 may be varied simply by sliding these elements toward or away from each other with the guide portions 29 riding between and on the guide bars 54, 55. For the purpose of further rigidifying and maintaining the alinement achieved by the connecting lugs 27, each side member is provided with a further reinforcing bar 57, 58 which is, of course integral with the injection molded side member and portions of the connecting lug to rigidify the angular relations between the lug and the body of the side member.

As illustrated in FIG. 4, the fixture is adapted to be utilized at times with a tote box 23 which may employ a plastic transparent cover, not shown. The tote box has a width equal to the extent of the skeletal end frames of the fixture so that the side elements 43, 44 of the end frame may be received within grooves 60, 61, and the like, which are formed in the plastic tote box. The modular concept and techniques of handling are available with the illustrated arrangement of the fixture and tote box simply by employing two or three different lengths of side members which may combine to fit the length of the selected tote box and further utilizing end frames of the proper length to fit the width of the tote box. Different lengths of circuit boards or other similar items may be handled by each fixture and, in fact, by the same fixture simply by employing four side members, two pairs of mutually facing sides, all mounted to the same single pair of end frame members.

The item supporting ledge 25 is preferably spaced some distance above the bottom of the side members so as to afford increased protection for the bottom edges 18 of circuit boards 19 which may have notched corners as indicated at 26.

While not necessarily desirable for fixtures which are to be utilized with a tote box, such as box 23 illustrated, will be appreciated that a number of fixtures can be adapted for stacking simply by providing suitable configuration on the top and bottom of the end frames.

It will be seen that there has been provided a simple, flexible and inexpensive fixture of novel design and configuration which is arranged for the greatest efficiency in the edge handling of items with critical and delicate surface areas. The fixture embodies a number of significant features by the use of particular side members of injection molded manufacture and an end frame skeletal configuration provided by rigid rods bent in the desired shape, together with a novel improved adjustable connecting device between the skeletal frame rods and the molded plastic side members.

Although the invention has been described and illustrated in detail, it is to be clearly understood that the same is by way of illustration and example only and is not to be taken by way of limitation, the spirit and scope of this invention being limited only by the terms of the appended claims.

I claim:

1. An adjustable grooved fixture comprising a pair of upstanding mutually spaced side members of substantially corrugated horizontal section providing vertically extending grooves for receiving edges of items to be supported in the fixture, a pair of end frames each having horizontally extending guide means, connecting means rigidly secured to each end of each said side member and slidably engaged in said guide means, and means for releasably securing said connecting means to said guide means.

2. An adjustable grooved fixture comprising a pair of upstanding mutually spaced molded side members of substantially corrugated horizontal section providing vertically extending grooves for receiving edges of items to be supported in the fixture, each said side member having a relatively narrow inwardly projecting ledge extending along the lower portion thereof to close the bottoms of said grooves and provide support for said items, a pair of skeletal end frames each having horizontally extending guide means, connecting means secured to each end of each said side member and slidably engaged in said guide means, and means extending through said side members and end frames for releasably securing said connecting means to and within said guide means.

3. An adjustable grooved fixture comprising a pair of upstanding mutually spaced molded side members of substantially corrugated horizontal section providing vertically extending grooves for receiving edges of items to be supported in the fixture, each said side member having a relatively narrow inwardly projecting ledge extending along the lower portion thereof to close the bottoms of said grooves and provide support for said items, a pair of skeletal end frames each having a pair of vertically spaced horizontally extending guide bars, a connecting lug secured at each end of each said side member, said lug being of substantially T-shaped cross section and having an outwardly projecting leg portion thereof slidably received between said guide bars, and a connecting device for clamping said lug to said guide bars.

4. An adjustable grooved fixture for holding and handling items with critical surfaces of card-like configuration such as printed circuit boards, printed circuit board assemblies and the like, comprising, a pair of similar molded side members having mutually opposed vertical slots formed on the inner faces thereof and alternate lands and grooves on the outer faces thereof, each land on an outer face being alined with a corresponding groove on an inner face, each groove on an outer face being alined with a corresponding space between grooves on an inner face, each side member having a continuous outwardly projecting perimetral flange and a pair of horizontal longitudinally extending outwardly projecting reinforcing ridges closely following the configuration of said lands and grooves of said outer face, a horizontally extending inwardly projecting ledge being formed on each said member at the lower portion thereof to close the bottoms of said inner face grooves and provide support for items to be handled, each said side member having an inwardly projecting connecting lug affixed to each end thereof, each said lug having a reinforcing and guide portion extending inwardly from the associated side member for the length of the lug and projecting outwardly of said lug, said guide portion being substantially narrower than said lug, each said lug and guide portion having an aperture extending therethrough, a pair of end frames, and means for adjustably securing said end frames to said connecting lugs.

5. An adjustable grooved fixture for holding and handling items with critical surfaces of card-like configuration such as printed circuit boards, printed circuit board assemblies and the like, comprising a pair of spaced vertically grooved side members each having a connecting lug rigidly secured to an end thereof, each said lug being of substantially T-shaped cross section with a guide portion projecting from the body thereof; and a pair of skeletal end frames, each frame comprising an outer rod of rectangular configuration having inwardly extending but mutually spaced end portions, each said outer rod including a bottom element and a pair of side elements all continuous with said rod end portions, each said frame including a handle rod of substantially inverted U-shape having vertical leg portions affixed to and extending between an end portion and bottom element of said outer rod, the upper ends of said leg portions being bent outwardly of said outer rod to connect with an integral bight portion lying outwardly of said end frames, each said end frame having a pair of horizontally extending guide bars affixed to said leg portions and mutually spaced vertically by a distance substantially equal to the vertical extent of the guide portion of the lugs of said side members, said guide portions being received between said guide bars, and connecting devices extending through said lugs for securing the side members to said guide bars.

6. An open adjustable grooved fixture for holding and handling items with critical surfaces of card-like configuration such as printed circuit boards, printed circuit board assemblies and the like, comprising, a pair of similar molded side members having vertical slots formed on the inner faces thereof, a horizontally extending inwardly projecting ledge formed on each said member at the lower portion thereof to close the bottoms of said inner face grooves and provide support for items to be handled, each said side member having an inwardly projecting connecting lug affixed to each end thereof, each said lug having a reinforcing and guide portion extending inwardly from the associated side member for the length of the lug and projecting outwardly of said lug, said guide portion being substantially narrower than said lug, each said lug and guide portion having an aperture extending therethrough, a pair of skeletal end frames, each comprising an outer rod of rectangular configuration including a bottom element and a pair of side elements, each said frame including a handle rod of substantially inverted U-shape having vertical leg portions affixed to said outer rod, the upper ends of said leg portions being bent outwardly of said outer rod to connect with an integral bight portion lying outwardly of said end frames, each said end frame having a pair of horizontally extending guide bars affixed thereto and mutually spaced vertically by a distance substantially equal to the vertical extent of the guide portion of the lugs of said side members, said guide portions being received between said guide bars, and connection devices extending through said lug apertures for securing the side members to said guide bars.

7. An open adjustable grooved fixture for holding and handling items with critical surfaces of card-like configuration such as printed circuit boards, printed circuit board assemblies and the like, comprising, a pair of similar side members having vertical slots formed on the inner faces thereof, each said side member having an inwardly projecting connecting lug affixed to each end thereof, each said lug having a reinforcing and guide portion extending inwardly from the associated side member for the length of the lug and projecting outwardly of said lug, said guide portion being substantially narrower than said lug, each said lug and guide portion having an aperture extending therethrough, a pair of end frames having guide means slidably receiving said guide portions, and connecting devices extending through said lug apertures for securing said end frames to said side members.

8. An open adjustable grooved fixture for holding and handling items with critical surfaces of card-like configuration such as printed circuit boards, printed circuit board assemblies and the like, comprising, a pair of similar molded side members having mutually opposed vertical slots formed on the inner faces thereof and alternate lands and grooves on the outer faces thereof, each land on an outer face being alined with a corresponding groove on an inner face, each groove on an outer face being alined with a corresponding space between grooves on an inner face, each side member having a continuous outwardly projecting perimetral flange and a pair of horizontal longitudinally extending outwardly projecting reinforcing ridges closely following the configuration of said lands and grooves of said outer face, a horizontally extending inwardly projecting ledge being formed on each said member at the lower portion thereof to close the bottoms of said inner face grooves and provide support for items to be handled, each said side member having an inwardly projecting connecting lug affixed to each end thereof, each said lug having a reinforcing and guide portion extending inwardly from the associated side member for the length of the lug and projecting outwardly of said lug, said guide portion being substantially narrower than said lug, each said lug and guide portion having an aperture extending therethrough, a pair of skeletal end frames, each comprising an outer rod of rectangular configuration having inwardly extending but mutually spaced end portions, each said outer rod including a bottom element and a pair of side elements all continuous with said rod end portions, each said frame including a handle rod of substantially inverted U-shape having vertical leg portions affixed to and extending between an end portion and bottom element of said outer rod, the upper ends of said leg portions being bent outwardly of said frames to connect with an integral bight portion lying outwardly of said end frames, each said end frame having a pair of horizontally extending guide bars affixed to said leg portions and mutually spaced vertically by a distance substantially equal to the vertical extent of the guide portion of the lugs of said side members, said guide portions being received between said guide bars, and connecting devices extending through said lug apertures for securing said side members to said guide bars.

9. The fixture of claim 8 wherein the sides of the upper ends of each of said inner face grooves are upwardly divergent and the inner and upper corners of each side member is beveled so as to facilitate insertion of items into said grooves.

References Cited in the file of this patent

UNITED STATES PATENTS

| | | |
|---|---|---|
| 970,491 | Grandperrin | Sept. 20, 1910 |
| 1,019,212 | Yates | Mar. 5, 1912 |
| 1,480,043 | Blakeslee | Jan. 8, 1924 |